March 8, 1960  T. A. CRAWFORD  2,927,955
INSULATING COVER
Filed Jan. 18, 1956

INVENTOR.
THOMAS A. CRAWFORD
BY
EZEKIEL WOLF
HIS ATTORNEY.

United States Patent Office 2,927,955
Patented Mar. 8, 1960

2,927,955

INSULATING COVER

Thomas A. Crawford, Canton, Mass., assignor, by mesne assignments, to Cornell-Dubilier Electric Corporation, South Plainfield, N.J., a corporation of Delaware Application January 18, 1956, Serial No. 560,047

2 Claims. (Cl. 174—138)

The present invention relates to an insulating cover for an electrical connection, but principally for one carrying high power or high voltage.

The present invention is more particularly related to insulating covers for high tension bushings or bushings carrying higher than normal voltages.

It is my desire to cover such bushings for general protection as well as for insulating purposes; for this reason, the cover should be of fairly durable material, and such that the bushing is generally protected as well as insulated.

In the present invention, the cover is of such a type which may be easily slipped over the bushing and secured in place without additional tying elements or binding members and without interfering with any of the connections wihch are made through the bushing, as by wires leading in to either side of the connecting elements of the bushing.

In the ordinary outdoor connection, a bushing with an insulating element is usually used to which the lead in wires are connected, one from one side and one from the other side, with the electrical or conductive element in the bushing furnishing a core or a surrounding collar for the bushing itself. In such a case, the bushing may be supported on a pole or on a rod and the wires extend on either side of the bushing to the next supporting element, such as a pole or a rod, which may be a number of feet away.

The insulating cover in these cases is ordinarily slipped over the bushing by parting a cover along a center line and slipping it over the top of the bushing and then securing the two halves of the cover together in abutting relationship, as will more specifically appear in the description in the specification below.

In the present arrangement, the insulaitng cover is easily parted and applied over the bushing and by self-contained means will hold itself in place; but, if it is desired, something like a rubber band may be used at the bottom of the cover as an additional binding for the cover over the bushing.

Further description of the merits and advantages of the present invention will be made in connection with the drawings in which.

Figure 3:
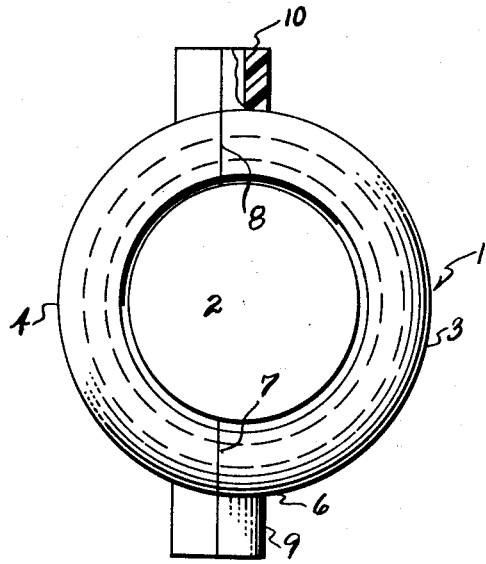
Figure 3 shows a bottom view of the bushing as viewed from the bottom of either Figure 1 or 2.
Figure 2:
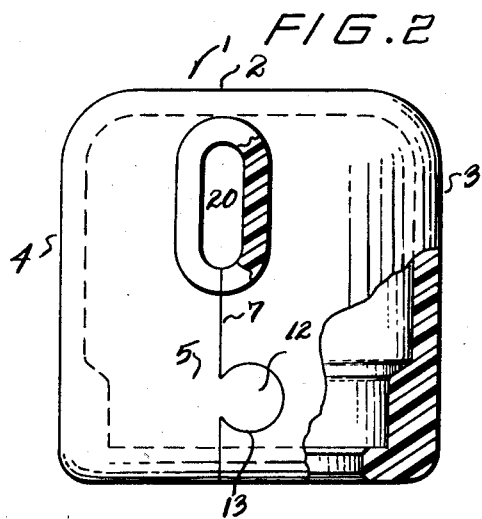
Figure 2 shows a fragmentary sectional view of the bushing as viewed from the left side of Figure 1.
Figure 1:
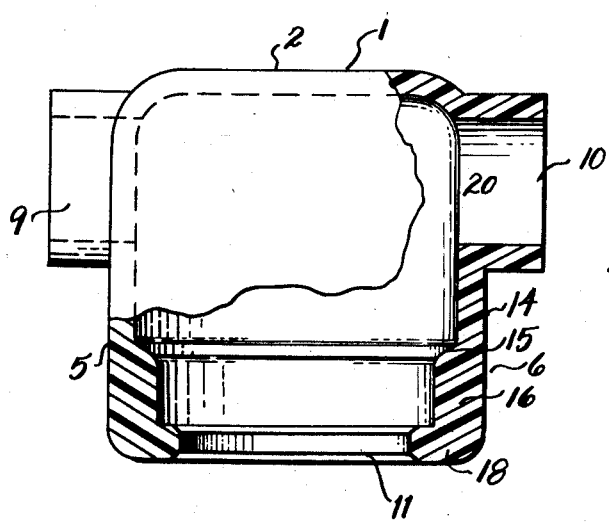
Figure 1 shows a side view of the bushing with fragmentary sections.

In the arrangement indicated in the figures, the cover comprises a shell 1 which is continuous on the top 2 and on two opposite side portions 3 and 4 and split on the other two opposite side portions 5 and 6 along lines 7 and 8 (see Figure 3).

These lines of cleavage or splits 7 and 8 extend on opposite side portions from the bottom opening 11 upwardly to the lower parts of the opposite projecting arms 9 and 10. These splits have an arcuately curved section of more than 180° between the bottom of the arms 9 and 10 and the bottom opening 11 forming a tongue 12 and groove 13 interlocking section. As illustrated, it is preferable that this section be positioned towards the bottom of the cover in the neck section 16. It should be noted that although an arcuate tongue and groove arrangement is preferable, other shapes may be used. The two side projecting arms or sleeves 9 and 10 have openings 20 through which wires may extend from the inside of the bushing through the cover to the next bushing on the next pole or support.

The cover, as indicated in Figure 3, is round, but with an opening 11 at the bottom adapted to fit about the bushing; but any shape may be used, as for instance square or polygon depending upon the bushing covered.

The arms 9 and 10, however, should extend outward from substantially opposite points on the side, and the split in the cover along the lines 7 and 8 should extend from the center of the arms to the bottom opening of the cover, so that the cover may be bent or folded on the top 2 along a line parallel to the arms 9 and 10. By parting the cover on the lines of cleavage 7 and 8 in this manner, the cover may be slipped over the top of the bushing with the lead in wires positioned in the sleeve 9 and 10. The cover is locked by engaging the tongues 12 and their respective grooves 13.

The cover 1 may be made of insulating material such as rubber or it may be made of semi-rigid material sufficiently soft enough so that the cover can be opened at the bottom for an insertion over the bushing. Ordinarily black vulcanized rubber is good for general use and rubber substitutes like neoprene are also adaptable for the same purpose. The insulating cover has walls of uniform thickness as indicated at 14, with this uniform thickness extending downward towards neck section 16 encircling the bottom of the cover from the line 15. At this neck section, the cover is considerably thicker in cross-section and extends downwardly to the opening 11 on this thicker cross-section, providing a supporting peripheral lip 18 at the base of the opening.

This construction permits a heavier tongue 12 to be formed in the side portions 5 and 6 of the cover and a correspondingly heavy groove or hole 13 to engage this tongue. If desired for permanent installation, although not absolutely necessary, a band of tape or the like may be wrapped about the neck section of the cover after it is installed on the bushing.

Having now described my invention, I claim:

1. A cover of flexible dielectric material for insulating a bushing comprising a normally continuous cylindrical wall, a top wall integral with and extending over one end of the cylindrical wall, a pair of aligned openings formed on opposite sides of the cylindrical wall, sleeves integral with and extending outwardly from the cylindrical wall and completely encircling the openings, slits formed in the cylindrical wall and extending from the other end of the cylindrical wall to the openings and the sleeves, said slits permitting the normally continuous cylindrical wall to be parted so that it can be placed over the bushing, said cylindrical wall being thicker at said other end, tongues and grooves formed as smooth continuations of said walls and defined by said slits at said thicker portions and as an integral nonprojecting part of the cylindrical wall to hold said cylindrical wall in its normally continuous condition.

2. A device as set forth in claim 1, wherein said thicker portion comprises an annular shoulder section positioned on the inner surface of said cylindrical wall with an inwardly extending annular flange formed at the lower end of said shoulder section, and with said tongues and grooves formed in said shoulder section.

References Cited in the file of this patent

UNITED STATES PATENTS

| | | |
|---|---|---|
| 420,171 | Seely | Jan. 28, 1890 |
| 1,598,155 | Salisbury | Aug. 31, 1926 |
| 1,931,949 | Lockyer | Oct. 24, 1933 |
| 2,699,960 | Callery et al. | Jan. 18, 1955 |

FOREIGN PATENTS

| | | |
|---|---|---|
| 221,150 | Great Britain | Sept. 4, 1924 |